United States Patent [19]
Kneipp

[11] Patent Number: 5,343,518
[45] Date of Patent: Aug. 30, 1994

[54] SYSTEM AND METHOD FOR CONTROLLING THE DIALING ORDER OF CALL RECORD LISTS IN AN AUTOMATED DIALING SYSTEM

[75] Inventor: F. Paul Kneipp, Nashua, N.H.

[73] Assignee: Davox Corporation, Westford, Mass.

[21] Appl. No.: 5,481

[22] Filed: Jan. 14, 1993

[51] Int. Cl.⁵ .............................................. H04M 3/00
[52] U.S. Cl. .................................... 379/355; 379/265; 379/266; 379/356; 370/110.1
[58] Field of Search ................. 379/355, 265, 266, 92, 379/356, 113; 370/110.1

[56] References Cited

U.S. PATENT DOCUMENTS

| | | | |
|---|---|---|---|
| 4,620,066 | 10/1986 | Bushnell et al. | 379/113 |
| 5,014,266 | 5/1991 | Bales et al. | 370/110.1 X |
| 5,155,763 | 10/1992 | Bigus et al. | 379/113 |

Primary Examiner—James L. Dwyer
Assistant Examiner—Paul A. Fournier
Attorney, Agent, or Firm—Daniel J. Bourque; Anthony G. M. Davis; Michael J. Bujold

[57] ABSTRACT

A system and method for controlling the dialing order of a plurality of call record lists by a predictive dialing system are disclosed. The system includes a flow controller and a list controller. The list controller receives a number of call records from a call list provider for establishing a plurality of call record lists. The flow controller links one or more call lists in a predetermined order to form one or more list flow campaigns which may be later edited or joined together by the flow controller. A predictive dialer receives the call lists according to the list flow campaign and dials telephone numbers in the order directed by the linked call record lists which form the flow campaign. Also disclosed is a method for linking call record lists. The method includes the steps of selecting at least a first call list and a second call list from a plurality of active call record lists, and linking one call record in the first call list to one call record in the second call list to form a flow campaign, and subsequently applying the flow campaign to a dialing system.

19 Claims, 4 Drawing Sheets

SYSTEM AND METHOD FOR CONTROLLING THE DIALING ORDER OF CALL RECORD LISTS IN AN AUTOMATED DIALING SYSTEM

FIELD OF THE INVENTION

This invention relates to telephony management systems and more particularly, to predictive dialer management systems.

BACKGROUND OF THE INVENTION

As is known in the art, predictive dialer systems typically perform call processing operations and manage the two-way flow of data between a host computer, an operator workstation and a predictive dialer and the two way flow of voice signals between an operator and a called party. Typically, call records which include telephone numbers to be called, are down loaded as a batch file from the host computer to a telecommunication system management unit.

As is also known, such dialing systems use groups of call records generally referred to as a "list." The list is typically generated by grouping call records having a common characteristic. Such lists are provided to the predictive dialer. An operator "logs on" to one of the lists through the predictive dialer and the predictive dialer performs the dialing function. The operator must wait until the dialer provides a line to the operator. When the dialer dials a phone number however, the dialer may get no answer, a busy signal or an answering machine before getting a live answer to connect to an operator. When each of the call records in a particular list have been dialed, the predictive dialer automatically "logs off" the operator from the list. Thus, it is possible for the operator to be logged off without ever being connected to a line or party. Furthermore, after the operator is "logged off" the operator typically fails to have any tasks to perform and thus the operator continues to be unproductive.

An operator supervisor will then typically prepare another call list which the operator may log on to. Therefore the operator must manually log on to a second list which the supervisor has prepared and made available to be dialed.

Generally, the operator supervisor must constantly monitor the condition of the lists being dialed and the operator assignments. Once an operator becomes available, that is, once the predictive dialer has logged the operator off a list that is ending, the supervisor must then communicate to the operator which list the operator should next log on to. This process of manually logging on and logging off lists is time consuming, inefficient and causes the operator to experience considerable amount of downtime or idle time.

This problem is compounded when there exists a large number of lists each consisting of a small number of call records. For example, when a list having only 1 or 2 call records therein is provided to the operator, the dialing system rapidly dials the 2 numbers in the list. In this situation, the operator logs on to the list and shortly thereafter the predictive dialer logs off the operator. Thus, the amount of downtime each operator experiences is further increased since the operator is often waiting for the supervisor to prepare a new list and direct the operator to log on to the new list.

SUMMARY OF THE INVENTION

In accordance with the present invention, a method of controlling the dialing order of a plurality of call record lists by a predictive dialer includes the steps of selecting a set of calling lists, ordering the set of calling lists in a first predetermined order, joining one record from a first call list to one record from a second call list to provide a flow, and applying the flow to a predictive dialer such that the predictive dialer may dial phone numbers in a predetermined order as directed by the flow. With this particular arrangement, automated call list assignments which may be directed to the predictive dialer are provided. By connecting lists within a flow, the present method provides a predetermined sequence of call lists and operator assignments and thus, minimizes the amount of unproductive time which exists between assignments.

When a calling list within a flow is ended, such as when all of the call records within the list have been dialed or when a supervisor ends the list, all operators logged onto that list are automatically logged onto the next calling list in the flow. Thus the operators do not have wait for a supervisor to provide them with their next calling list and the dialer may immediately begin dialing. Furthermore, the operator need not log on to the first list in a flow and different operators may log on to different lists within the same flow. Furthermore, several of such flows may be generated and each of the separate flows may be joined. Also, a flow may be joined to itself. Thus, the method provides greater flexibility in tailoring both the sequence in which the calls are made and the overall telephone campaign.

In accordance with a further aspect of the present invention, a predictive dialing system with automated call record list linking includes a predictive dialer, coupled to a management center including at least a flow controller and a call list controller. The call list controller manages the plurality of call lists provided to the predictive dialer. The flow controller creates and edits existing flows to enable one flow to be joined to another flow, or to enable call lists to be added or removed from an active flow, in real time.

The predictive dialing system may further include a host processor coupled to the management center, for providing a plurality of call lists to the predictive dialer. With this particular arrangement, a predictive dialing system in which operator resources may automatically be flowed from one list to another is provided. By connecting lists within flows or one flow to another flow, the system provides a predetermined sequence of operator assignments and thus minimizes the amount of unproductive time which exists between assignments. When a calling list within a flow ends, such as when all of the call records within the list have been dialed, all operators logged onto that list are automatically logged onto the current active calling list in the flow.

Thus the operators do not have wait for a supervisor to provide them with their next calling list. Furthermore, an operator need not log on to the first list in a flow, and different operators may log on to different lists within the same flow. Thus, the flow controller provides greater flexibility in tailoring the sequence in which the calls are made. The flow controller also allows the order in which the call lists are linked to be changed without interrupting the operation of the predictive dialer.

DESCRIPTION OF THE PREFERRED EMBODIMENT

Figure 1:
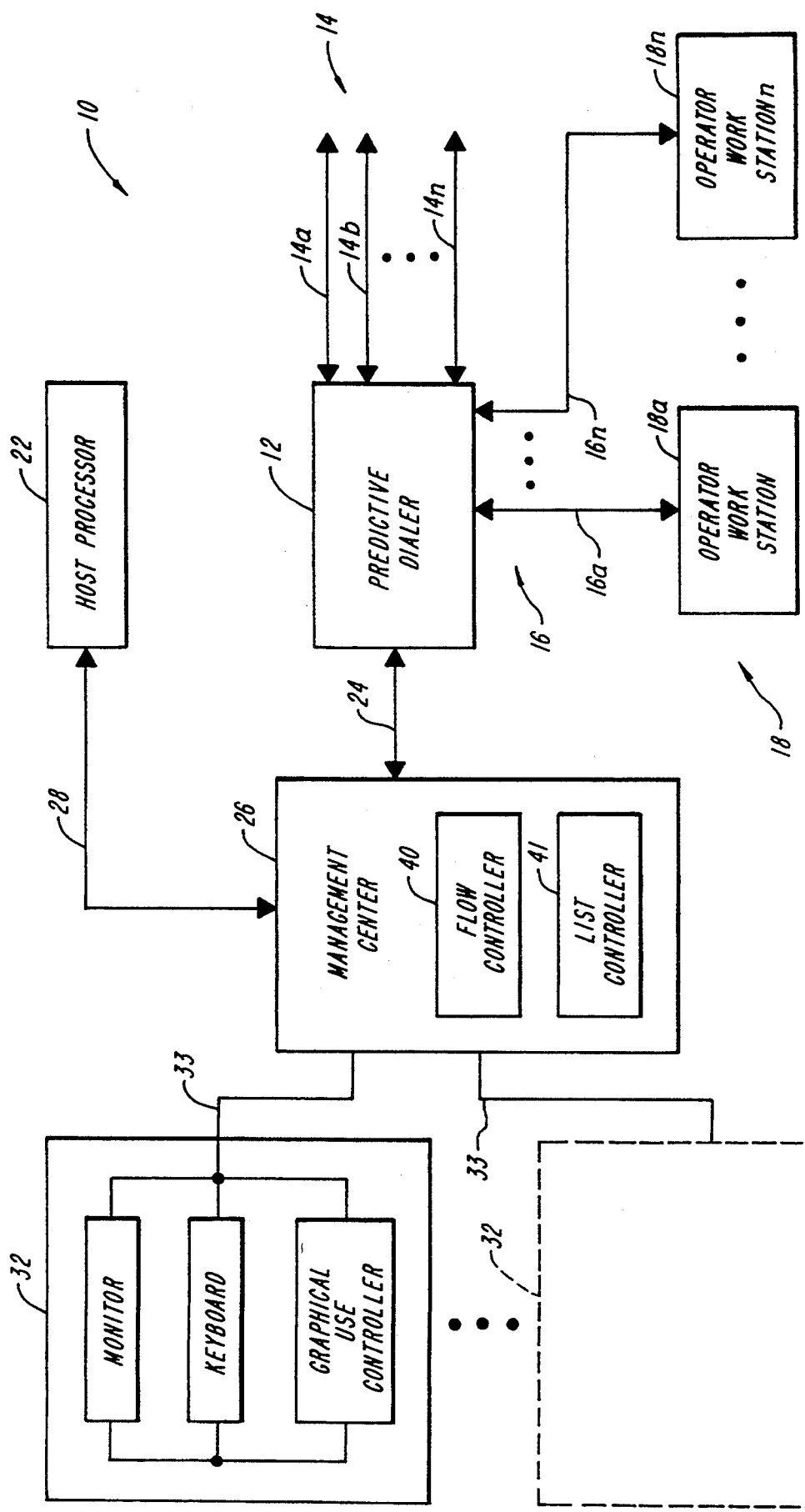
FIG. 1 is a block diagram of a predictive dialing system with flow control according to one embodiment of the present invention.

Referring now to FIG. 1, a predictive dialing system 10 includes a predictive dialer 12 having a plurality of telephone lines 14a–14n coupled thereto. The predictive dialer 12 may be provided, for example, as the CAS 2000 and CAS 500 models manufactured by DAVOX Corporation, Billerica, Mass., each of such systems supporting up to 64 phone lines and 32 phone operators.

A plurality of operator workstations 18a–18n, generally denoted 18, are coupled to the predictive dialer 12 through a corresponding one of the communication lines 16a–16n generally denoted 16. Communication lines 16 may be of the type adapted for transmission of both voice and data signals. The operation of the predictive dialer 12 and operator workstations 18 are described in co-pending U.S. Pat. application Ser. No. 07/532,453 filed on Jun. 4, 1990 and assigned to the assignee of the present invention and incorporated herein by reference.

The host processor 22 transfers call record files, also called lists, to a management center 26 via a data path 28. The management center 26 is coupled to the predictive dialer 12 through a bus 24. Portions of the management center 26 are described in co-pending U.S. Pat. application Ser. No. 07/706,251 filed May 28, 1991, and assigned to the assignee of the present invention and incorporated herein by reference.

The management center 26 has coupled thereto at least one supervisor workstation 32. Those of skill in the art however will recognize that a plurality of such workstations 32 may be coupled to the management center 26. The supervisor workstation 32 typically includes a display 34, a keyboard 36 and a graphical user interface (GUI) 38 which may include, for example, a so-called mouse and user intuitive icons displayed on the workstation display monitor 34, or other selector device such as a keyboard. The supervisor workstation 32 is coupled to the management center 26 through a conventional interface (not shown) and communication line 33 such that management center 26 may transmit data to, and receive data from, the workstation 32.

Figure 2:
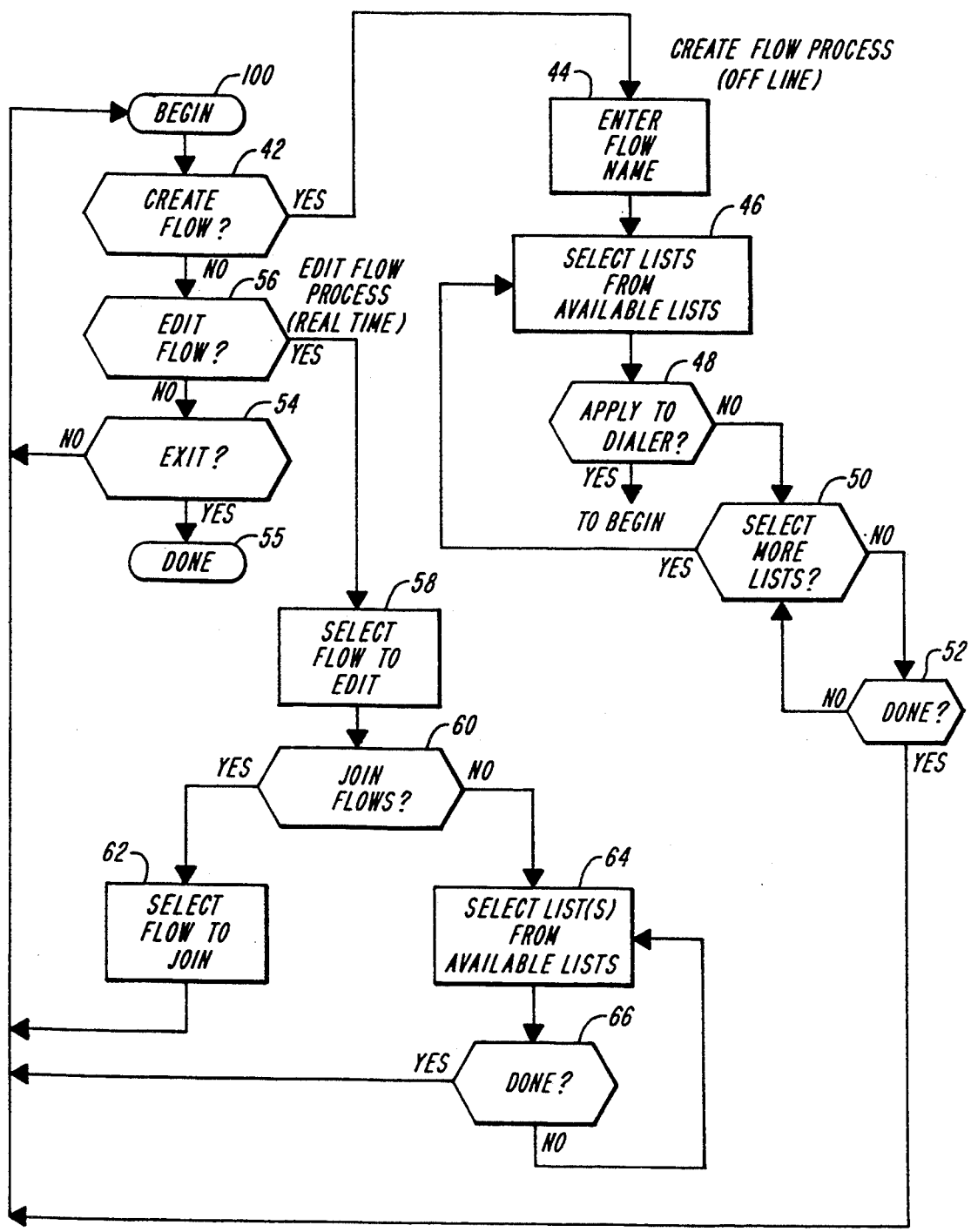
FIG. 2 is a flow diagram of the processing performed in the predictive dialing system with flow control of FIG. 1.

The management center 26 further includes at least a flow controller 40 and a call list controller 41, whose operation will be further described in conjunction with FIG. 2. Suffice it here to say that flow controller 40 and call list controller 41 cooperate with other portions of the management center 26 to provide the predictive dialer 12 with at least one pre-ordered list of call records to be dialed. Those of skill in the art will recognize of course that although flow controller 40 and list controller 41 are here provided as a portion of the management center 26, flow controller 40 and/or list controller 41 may alternatively be provided as a portion of the predictive dialer 12 or the host processor 22. Thus the flow and list controllers 40 and 41, may be disposed in a most convenient, cost efficient or otherwise desirable location and coupled to other portions of the system as required to provide an operative system.

In operation, an operator (not shown) typically attends a corresponding one of the operator workstations 18a–18n. The predictive dialer 12 dials a phone number from one of the call records in a list of such call records assigned to a particular one of the operators. If the call requires the service of the particular operator, the predictive dialer 12 transfers the call to the corresponding one of the operator workstations 18a–18n where the operator may service the call.

An operator supervisor (not shown) typically attends the supervisor workstation 32 although constant monitoring of a flow campaign as in the prior art is not necessary and indeed is a feature of the present invention. The supervisor may, through the keyboard 36 or the graphical interface 38, for example, simultaneously direct the management center 26 to monitor the performance of the operator and the performance of the predictive dialer 12. The management center 26 is capable of providing real time status information of the operator and predictive dialer performance to the display 34 on which the supervisor may view the information.

When necessary, the supervisor may adjust the operation of the predictive dialing system 10 to meet predetermined objectives and performance goals. For example, the supervisor may adjust the length of time the predictive dialer 12 takes between dialing successive phone numbers. After such adjustments are implemented, the management center 26 may then compare performance results before and after the adjustment to determine if the adjustments are having the desired effect. Thus, through the management center 26, the supervisor has real time access to the information provided from the predictive dialer 12 and from the operator (not shown) and such information may be used to optimize system performance.

In previous systems, such information was unavailable until completion of a call list or upon request to past historical data by the supervisor. Furthermore, previous systems required separate procedures to monitor the information provided to the predictive dialer 12 and to the operator.

TERMINOLOGY

Before describing the processing steps performed in the predictive dialing system 10, and in particular the processing steps performed in the flow and list control system, some introductory concepts and terminology are explained.

A record which contains information (e.g phone number, address, etc.) pertaining to a particular entity (e.g. a customer, etc.) may be referred to as "a call record" or "an account." A group of call records is termed "a list of callers" or "a calling list" or more simply, "a list."

A list of callers that has been prepared for calling by the supervisor via the list controller 41 which is a part of management center 26 may be referred to as being "established". In establishing a list, the supervisor selects a list, specifies its start-up values (start record, stop record, any desired filter, etc.) and provides these values to the dialer 12. The dialer 12 validates all of the start-up parameters, loads any corresponding digital voice files required for hold messages, and provides the management center 26 with an indication that the list is "established."

Established lists may be "active." That is, an operator has logged onto the list and the predictive dialer 12 (FIG. 1) is dialing call records within the lists. Established lists may also be "suspended." That is, no call records in the lists are currently being dialed because either the supervisor has manually stopped calling from the list via list controller 41, or all of the operators have manually logged off the list. Thus operator flow does not take place when in a suspended list.

When two or more lists are established, a supervisor may group or join the lists together in a predetermined order which may be generally referred to as "a flow campaign" or "an order campaign" or simply "a flow." Thus a flow is an ordered set of calling lists. Different flows may have a disproportionate number of accounts to be called. When a user generates a flow, the flow is named. The user may generate multiple flows, each having a unique name.

When a user is creating or changing a flow, he may select from "available" lists. A list is available if it is not already part of a flow. Thus, a display of all available lists would include all established lists (i.e active lists and suspended lists) that are not already part of a flow.

The flow is considered active if any of the records in the lists which comprise the flow are being dialed. The flow is considered to be inactive if none of the records in the lists are being dialed.

Also, when a call list within a flow ends, for example when all of the call records within the list have been dialed or when a supervisor manually ends the list, all operators logged onto that list are automatically logged onto the next calling list in the flow and the ended list is automatically removed from the flow.

A flow may be connected to another flow or to itself. When a plurality of flows are joined, this concept is generally referred to as "joining flows." For example, when a first or source flow joins to a second or destination flow this may mean that the operator on the last list in the source flow will be logged into (i.e. flow into) the first available list in the destination flow. Once the flow campaign is established, operator assignments and list activation are automatically managed via the management center 26, thus minimizing operator down time and supervisor intervention. When an operator comes to the end of a flow, that is when there is no next list in the flow to log on to, the operator is automatically logged onto a first list, generally the initial list, in the next connected flow.

However, an operator need not log on to the initial list in a flow but rather, the operator may log on to any available list in the flow. Furthermore, different operators may log on to different lists within the same flow.

A list or flow may be "applied." This refers to the sequence of events wherein the management center 26 provides the list or flow to the predictive dialer 12 such that the predictive dialer 12 begins dialing call records within the list or flow.

A list may be "suspending." This refers to a list that is in the process of causing dialing to temporarily halt. Lists may be suspended in one of two ways. The supervisor manually suspends the list via the list controller 41 (FIG. 1), or all of the operators log-off of the list. Operator flow does not take place when a list suspends.

A list may be referred to as "ended." This refers to a list that has been established and has ended because either the supervisor manually ended it via the list controller 41, or because all of the records in the list have been dialed. When lists end, regardless of whether it was done manually or automatically, operators flow to the next list in the flow and the ended list is automatically removed from the flow.

A list that is "ending" refers to a list that is running out of records to dial. As the number of communication lines 14 required to service the remaining records in the list is reduced, operators are logged-off. If the list is in a flow, these operators are logged onto the next list in the flow which have records waiting to be dialed and the predictive dialer 12 begins dialing the numbers in that list.

A list may be referred to as "inactive." Inactive lists are those lists that have been downloaded to the management center 26 and have not been established.

Referring now to FIG. 2, a flow chart of the processing steps performed by the management center 26 and the flow and list controllers 40 and 41 in order to establish and maintain a flow campaign are shown. The rectangular elements (typified by element 44) herein denote processing steps whereas the diamond shaped elements typified by element 42, herein denote decision steps which affect the subsequent processing steps.

As mentioned above in conjunction with FIG. 1, the management center 26 is provided for managing, among other tasks, the plurality of call lists and for monitoring the calling processes of the dialing processing stations 18. The flow and list controllers 40 and 41 are provided for linking a plurality of call lists or flows and for applying call lists or flows. Furthermore, the list controller 41 may change the order in which the predictive dialer 12 dials the call records in a particular list. The list controller 41 may also change the order in which the lists are joined. Similarly, the flow controller 40 may change the order in which the flows are joined. All such changes are performed in real time; after a first or previous flow assignment has been made and the flow has been "applied" to the dialer.

Turning now to FIG. 2, step 42 provides an option wherein, if selected, a flow may be created, which is performed offline. If a flow is to be created, processing continues to step 44 which requires a user, such as a supervisor for example, to name the flow. Once the supervisor designates the flow name, the flow controller 40 (FIG. 1) determines whether any flows exist having this same name. If no other flows with this same name exist, the flow controller 40 provides available call lists (i.e. all of the active and suspended lists) to the display 34 (FIG. 1).

At step 46, predetermined call list(s) desired for the present flow are selected from the available call lists by the call list controller 41. Often, it may be desirable to provide the call lists such that each call record within the list has at least one common characteristic. For example, the common characteristic may correspond to a geographical characteristic, or a characteristic trait of the entity, or it may be that each entity within the list has not been contacted within the past thirty days. When a list is selected, it is added to the flow. Alternatively, a list may be de-selected in which case it is removed from the flow.

The lists which the user has selected may be shown on the display 34 (FIG. 1) in the order in which the lists appear in the flow. When lists are selected by the user, they may be added to the flow in sequence. Thus, the first list selected may correspond to the initial list in the flow, the second list selected may correspond to the second list in the flow, etc. The order in which the lists appear in the flow may, of course, be changed as will be described below. The lists are then ordered in a predetermined sequence to provide a flow (also referred to as a campaign or a flow campaign).

Figure 3:
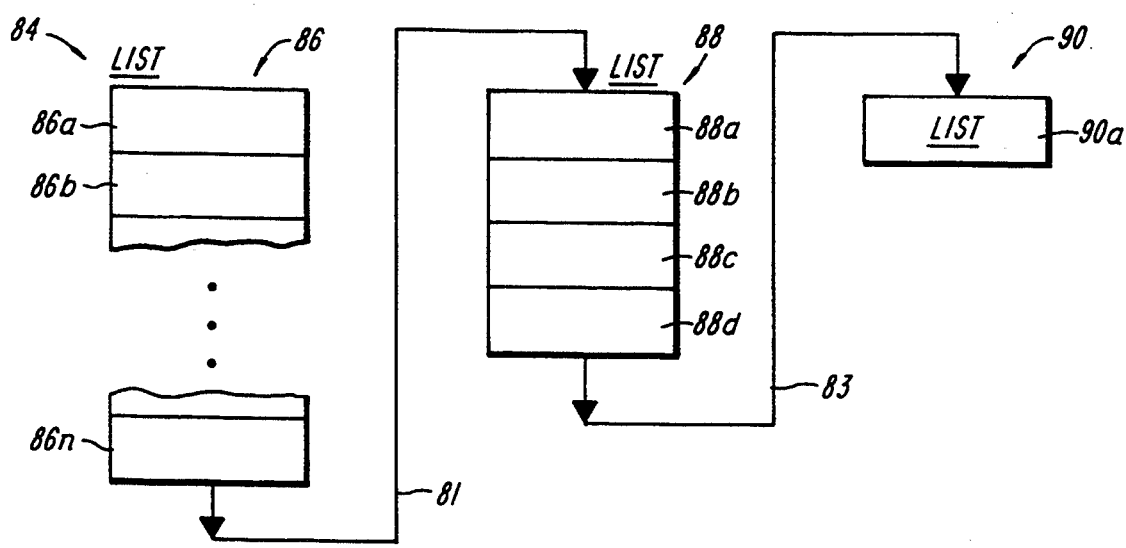
FIG. 3 is a diagrammatical representation of a flow campaign provided by a plurality of joined calling lists.

Referring briefly now to FIG. 3, a flow campaign 84 typically includes a plurality of lists 86, 88, and 90. Each of the lists 86, 88 and 90 includes at least one record. In this example, the list 86 includes a plurality of records 86a–86n, list 88 includes four records 88a–88d, and list 90 includes a single record 90a. Each of such records 86a–86n, 88a–88d and 90a typically includes information such as telephone numbers.

Here, the lists have been ordered such that predictive dialer 12 (FIG. 1) dials the telephone number in the initial record 86a and subsequently dials the phone numbers of each successive record 86b–86n. Since the final record 86n in the list 86 is joined to an initial record 88a in the list 88 through a link 81, after the predictive dialer 12 dials the phone number in the final record 86n, the predictive dialer 12 automatically, without any user interruption required, dials the phone number in the record 88a. Likewise, record 88d is joined to record 90a through a link 83. A link (81, 83) in this example is a "software" interconnection between two lists which indicates to the predictive dialer where to retrieve the next telephone number for the next record to be dialed. Links between lists and flows are similar "software" interconnections.

Thus, after the predictive dialer 12 dials the telephone number in the final record 88d of list 88, the predictive dialer 12 automatically, without any user intervention, dials the telephone number in record 90a of the next list 90. Thus, an operator attending one of the operator workstations 18 (FIG. 1) may receive a call from any of the call records in any of the lists 86, 88 and 90.

It should be noted that lists 86, 88 and 90 may be joined in a different order utilizing the list controller of the present invention. For example, record 86n may be joined to record 90a and record 90a may then be joined to record 88a. It should also be noted that flow campaign 84 is illustrated herein by the three lists 86, 88 and 90. Those of skill in the art however will recognize that any number of lists (two or more), may be joined to provide the flow 84.

To add a list to a flow, a link between one record (typically the "last" record in terms of physical order) in a first list and one record in a second list (typically the "first" physical record in terms of physical order) may be broken, and a "first" record in a third list may be joined to the "last" record in the first list, while a "last" record in the third list may be joined to the "first" record in the second list.

Further, two or more flows may be joined together in real time, after being "applied" utilizing the flow controller of the present invention. For example, referring momentarily to FIG. 4, flow campaign 84' includes a plurality of joined flows 84a, 84b and 84c. Each of the flows 84a, 84b and 84c may be similar to the flow 84 described in conjunction with FIG. 3. Here, flow 84a is joined to flow 84b which in turn is joined to flow 84c. Thus in flow sequence 84', the predictive dialer 12 (FIG. 1) first accesses flow 84a, then flow 84b, then flow 84c.

It should be noted however that flows 84a, 84b and 84c may be joined in a different order. For example, flow 84c may be joined to flow 84b and the flow 84b may then be joined to flow 84c as will be described further below in conjunction with FIG. 4A. It should also be noted that here three flows 84a, 84b and 84c have been joined. Those of skill in the art however will recognize that any number of flows may be joined to provide the flow sequence 84'.

Returning again to FIG. 2, processing continues to step 48 wherein a decision is made whether a flow will or will not be applied to the predictive dialer 12. If the flow is to be applied to the dialer, the present method applies the flow to the dialer and afterwards returns the user to the beginning (step 100) to create or edit a flow, or to exit the process (step 54).

When the user has placed all desired lists in the flow (it need not be ALL of the available lists), the flow is applied to the dialer 12 which receives the flow sequence and the flow is ready to be used. The dialer 12 does not receive the name of the flow rather, the dialer 12 is merely provided information concerning which lists flow into which lists. Operators are then assigned to predetermined ones of the active list(s) in the flow.

If the flow is not to be applied at step 48, then as shown at step 50 it is decided if more list(s) are to be selected. If it is desired to add more lists to the flow, a loop is implemented wherein steps 46, 48 and 50 are repeated to provide the desired list(s) in the flow.

If, however, at step 50 it is not desired to add more lists to the flow being created, step 52 determines if the user is done, and wishes to end the create flow process in which case processing returns to Begin, step 100, which allows exit at step 54. If the user indicates at step 52 that the Create Flow process is not done, and perhaps more lists are to be selected, processing returns to step 50.

The smart management center 26, FIG. 1, and the supervisor workstation 32 monitors the status of a particular one of the lists or flows. The flow and list controllers 40 and 41, provide status information which may be used to provide a visual display of the active flows on the display 34. It should here be noted that the flow and list controllers 40 and 41, may provide the information to the display 34 (FIG. 1) in graphical format using icons. For example, a list may be represented on the display as a folder and a flow may be represented as a filing cabinet. With this type of representation, placing the folder in the filing cabinet indicates that the list represented by the folder is part of the flow represented by the filing cabinet. Other graphical formats (e.g, use of particular colors, blinking or flashing icons or other symbols, etc.) not herein described may also be used. Suffice it here to say that those of skill in the art will now recognize that there exists many ways of graphically representing the information provided by the flow controller 40.

If at step 42 it is not desired to create a new flow, a decision is made at step 56 as to whether or not a currently existing and active flow is to be changed or edited, which occurs in real time. If it is desired not to edit a flow, processing returns to the beginning and step 42.

If decision is made to edit the flow, the name of the flow to edit is selected from the list of active flows, step 58. The flow may be edited in one of a plurality of ways by the flow controller.

For example, it is next decided if two or more existing and active flows are to be joined or a previous joining order changed (re-ordering), step 60, processing continues to step 62 in which the user selects the flow to join to the flow currently being edited after which processing returns to the beginning and step 42.

When a flow is created, the dialer 12 does not receive any information such as flow order, etc., until the flow is applied. When a flow is edited, however, the flow and list controllers 40 and 41 (FIG. 1) inform the dialer 12 of each change (adding lists, re-ordering lists, removing lists from a flow, or joining flows) in real time, as the changes are made. Thus, the dialer 12 receives real time updates to the currently active flow campaign(s).

It should also be noted that lists may not be in more than one flow at a time. Thus, as noted above, when the user creates or edits a flow, only those lists that are not already in another flow are displayed on the display 34 (FIG. 1). However, list displays are dynamically altered to match current list/flow assignments.

For example, if two flows were running at the same time, and a first list, LIST A, for example, was removed from one flow, the list name would immediately appear as being an "available" list. Conversely, if the list was added to one of the flows, its name would immediately be removed from the "available" list for any other flow.

Once all lists have been added or deleted from the current flow being edited, step 66, processing returns to the beginning and step 42.

If it is desired to join flows at step 60, the flow order may be changed or one flow joined to another flow. That is, the link between one list in the first flow (typically the "last" list in terms of physical order) and one list in the second flow (typically the "first" list in terms of physical order) may be broken and a first list in a third flow may be joined to a first list in a fourth flow. Thus, it should be noted that the step of joining a flow by selecting flows to join (step 62) includes the steps of detaching one or more flows and rejoining one or more existing or new flows. Once the flow being edited has been "joined" to another, this change is applied automatically and immediately to the dialer.

Figure 4:
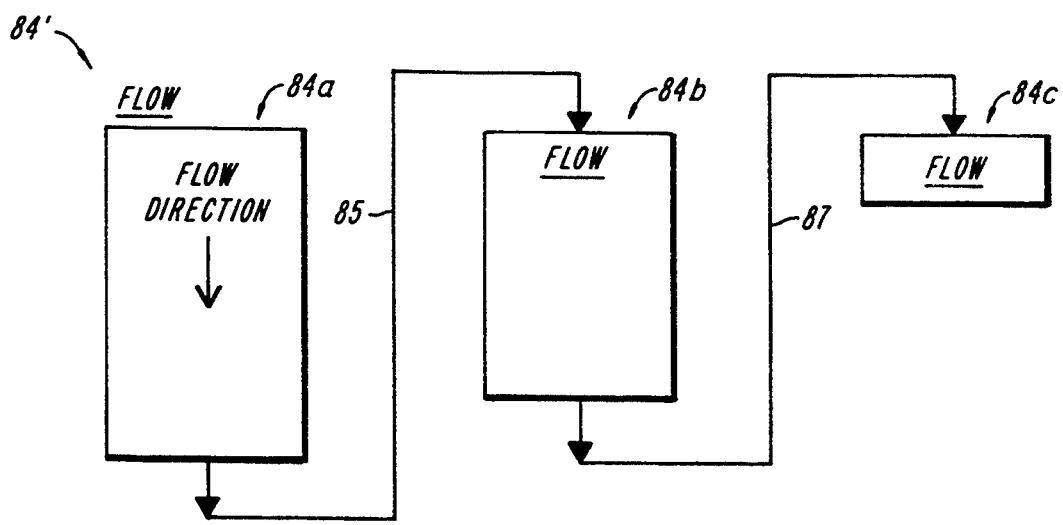
FIGS. 4 and 4A are diagrammatical representations of a plurality of joined flow campaigns.
Figure 4A:
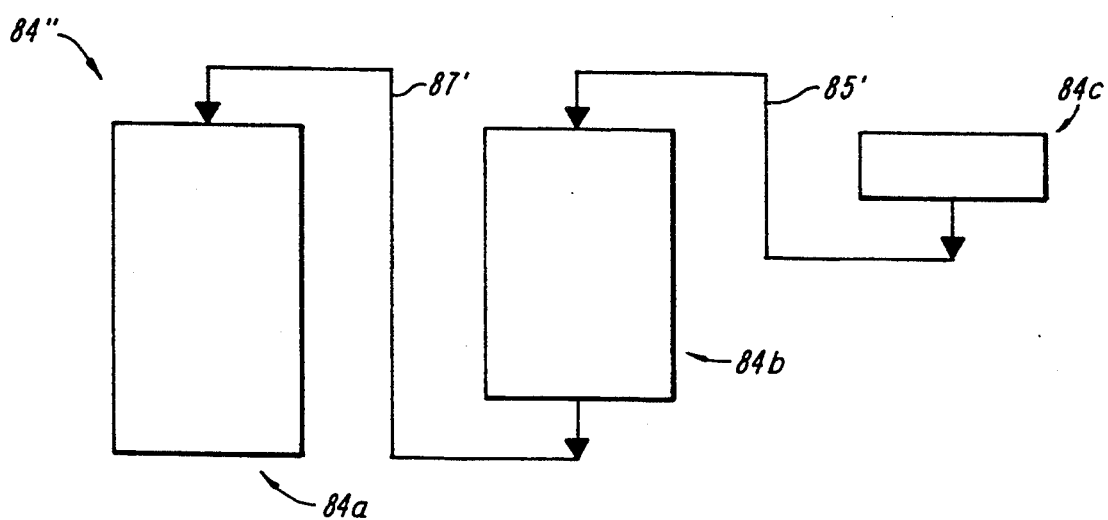

Referring briefly to FIG. 4A in which like elements of FIG. 4 are provided having like designations, the flow sequence 84' (FIG. 4) has been reordered to provide flow sequence 84". Here, the links 85 (FIG. 4) and 87 (FIG. 4) between flows 84a, 84b and 84c have been removed. In the flow sequence 84", a new link 85' joins flow 84c to flow 84b and a new link 87' joins flow 84b to flow 84a. In flow sequence 84", the predictive dialer 12 first accesses the flow 84c then flow 84b and then flow 84a. Thus the flow sequence 84" is reversed from the flow sequence 84' (FIG. 4).

Figure 5:
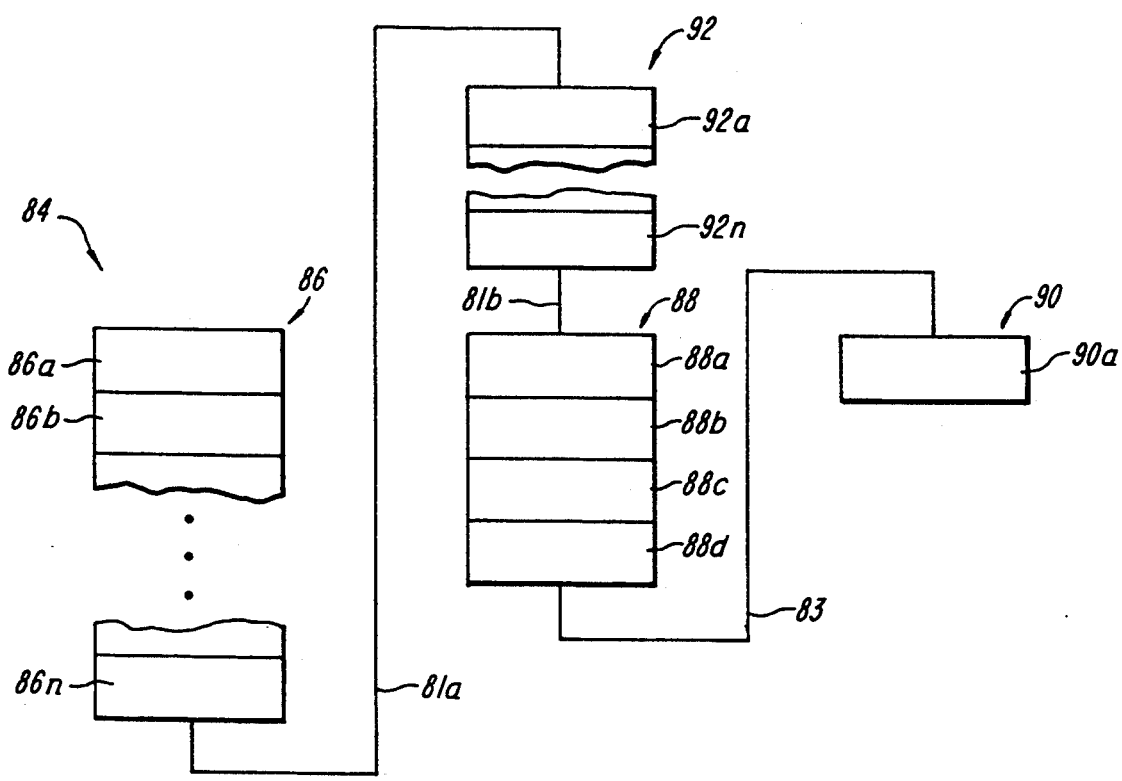
FIG. 5 is a diagrammatical representation of the flow campaign of FIG. 3 having a new calling list joined therein.

Referring briefly to FIG. 5, in which like elements of the flow campaign 84 (FIG. 3) are provided having like designations, the flow 84 may be reordered, for example, by breaking the link 81 (FIG. 3) between a first record, 86n in a first list 86 and a first record 88a in a second list 88. A first record 92a in a third list 92 may be joined to the record 86n in the list 88 through link 81a, and a second record 92n in the third list 92 may be joined to record 88a in list 88 through link 81b. Thus, the lists 86, 88 and 90 within the flow 84 have been reordered due to the addition of the list 92.

Consequently the predictive dialer 12 dials the records in the flow 84 in the sequence with which the lists 86, 92, 88 and 90 are now joined. Furthermore, those of skill in the art will now recognize that lists within the flow 84 may be joined in one of a plurality of predetermined orders.

EXAMPLE I

The operation of the dialing system 10 (FIG. 1) may be further understood by considering an example of joining lists. Assume a user of the dialing system has generated one flow and has named the flow, FLOW_A. Further, assume the flow includes three lists LIST_1, LIST_2, and LIST_3, provided in that particular sequence. After FLOW_A has been applied to the predictive dialer 12, the management center 26 considers the three lists as a group of lists named FLOW_A. The predictive dialer 12 sees only the list flow order. As mentioned above, the predictive dialer 12 does not concern itself with the flow name.

All lists in a flow may be logged onto at any given point. For example, given FLOW_A described above, a group of operators may log onto LIST_1, a second group of operators may log onto LIST_2 while a third group of operators may log onto LIST_3, with the end result being that all lists in FLOW_A are active simultaneously. This presents a situation where lists may end and be removed from FLOW_A out of sequence. LIST_2 may end before LIST_1. In this situation the dialer 12 would cause operators logged onto LIST_1 to flow or log onto LIST_3.

The dialer 12 performs the actual operator log-off's and log-on's between lists in the flow. Thus, when a list—s status changes from active to ending, either automatically (by reaching the end of the call records) or manually (supervisor ends the list), operators are automatically logged off the ending list and logged on to the next list in the flow sequence. This sequence is repeated for the remaining lists in the flow. When the last list in the flow ends, the operators are logged off of the system 10 unless the flow is joined to another flow as will be described below.

It is important to note that a list does not have to end completely for operator flow to begin. Operators may flow from a first list to a second list as the first list is ending, and the operator resource requirements for the ending list diminish.

EXAMPLE II

A second example may be useful to illustrate the concept of joining a plurality of flows. Thus, expanding on Example I above, it will here be assumed the user has generated two flows named FLOW_A and FLOW_B. FLOW_A includes the same list flow order described above (LIST_1 flows to LIST_2 which flows to LIST_3), while FLOW_B is generated having LIST_4 flowing to LIST_5 which flows to LIST_6.

Again, it is important to note that the dialer 12 has no knowledge of the fact that two flows have been generated. Rather the dialer 12 is only provided the list flow order.

Since the user has generated two separate flows, both flows may be activated by having operators log onto one of the lists in each of the flows. Thus, for example, operators may log onto LIST_1 in FLOW_A and LIST_4 in FLOW_B. With two separate flows, as in this example, when the last list in each has ended, the operators may be logged off the system. Since each flow may end at different times, the operators on one of the flows may be logged off with nothing to do, while the operators on the other flow are still hard at work on their lists. Thus, the operators' times are not being used efficiently.

This problem may be solved by having the supervisor, for example, via the flow controller 40 join the two flows.

Flows may be joined such that the last list in a source flow is joined into the first list in a destination flow. Here assume FLOW_A corresponds to the source flow and FLOW_B corresponds to the destination flow. Thus, if FLOW_A is joined to FLOW_B, the dialer 12 is provided the information to allow LIST_3 (the last list in FLOW_A) to flow into LIST_4 (the first list in FLOW_B).

After FLOW_A is joined to FLOW_B, the operators on LIST_3 will be logged onto LIST_4 when LIST_3 is ending. However, should FLOW_B end first, the operators in FLOW_B would have no work to do since their lists are exhausted. Thus, the operators assigned to FLOW_B would be logged off the system while FLOW_A operators are busy. Therefore, since only FLOW_A is joined to FLOW_B and FLOW_B was not joined to FLOW_A, the above described solution is satisfactory only if the lists in FLOW_A end before the lists in FLOW_B.

This problem, however, may be solved by joining FLOW_A and FLOW_B to provide a circular flow. In this example, a circular flow may be provided by joining FLOW_A to FLOW_B and subsequently joining FLOW_B to FLOW_A. Thus, in this instance the dialer 12 is provided the information necessary to have LIST_3 flow into LIST_4 (FLOW_A's link to FLOW_B) and to have LIST_6 flow into LIST_1 (FLOW_B's link to FLOW_A).

This flow joining or linking technique has the affect of causing all operators on all flows to be busy until all lists in each of flows FLOW_A and FLOW_B are ended. If FLOW_A ends first, the operators are logged into FLOW_B. If FLOW_B ends first, then the operators are logged into FLOW_A.

When a list ends, the list may be automatically removed from the flow it is in. When all of the lists in a flow end, the flow itself may be automatically removed from the system.

The flow control system 40 maintains the current list flow information in two database tables referred to as a "flow table" and a "flow entry table."

The flow table may be used to maintain the different flows which the user has generated. The flow table includes, among other information, the information required to uniquely identify a flow (flow_id), the flow name provided by a user, an identifier specifying a particular flow_id of a flow to which this flow is joined, and the number of lists provided in this flow.

The flow entry table may be used to maintain the list flow order generated by the user. The flow entry table includes at least the information required to specify the flow_id of the parent flow that corresponds to this list (parent_flow_id), a unique indicator which identifies this list position in the flow, an identifier corresponding to the list name (list_name) and an identifier corresponding to the list identifier (list_id).

The dialer flow controller 40 maintains a flow order such that regardless of which lists in a flow an operator logs onto, and regardless of which order the lists in the flow end, the integrity of the list flow order is maintained. For instance, in EXAMPLE 2 above, the totality of the flow specification (from the perspective of the dialer 12) may be represented as:

| | |
|---|---|
| LIST_1 flows to LIST_2 | |
| LIST_2 flows to LIST_3 | |
| LIST_3 flows to LIST_4 | ← FLOW_A's link to FLOW_B |
| LIST_4 flows to LIST_5 | |
| LIST_5 flows to LIST_6 | |
| LIST_6 flows to LIST_1 | ← FLOW_B's link to FLOW_A |
| LIST_2 flows to LIST_3 | |

In this example, if LIST_5 were to end first, the flow order would become:

| | |
|---|---|
| LIST_1 flows to LIST_2 | |
| LIST_2 flows to LIST_3 | |
| LIST_3 flows to LIST_4 | ← FLOW_A's link to FLOW_B |
| LIST_4 flows to LIST_6 | ← LIST 5 has been removed. |
| LIST_6 flows to LIST_1 | ← FLOW_B's link to FLOW_A |

In this example, the source flow (FLOW_A) only joins to one destination flow (FLOW_B). It is possible, however, that the source flow may join with a plurality of destination flows. Furthermore, a destination flow may have any number of source flows joined to it. Thus, FLOW_A and FLOW_B may both join FLOW_C.

Moreover, flows may be joined to themselves. That is, FLOW_A may be joined to FLOW_A. Joining FLOW_A to itself provides the following dialer flow order:

| | |
|---|---|
| LIST_1 flows to LIST_2 | |
| LIST_2 flows to LIST_3 | |
| LIST_3 flows to LIST_1 | ← FLOW_A's link to FLOW_A (itself) |

When in the case of circular flows (as described above with FLOW_A and FLOW_B) one of the flows ends (all lists end and the flow is removed) the remaining flow is left joined to itself.

EXAMPLE 3

A third example may be useful to illustrate the concept of a so-called tri-flow linking. Expanding now on EXAMPLE 2 provided above, consider a third flow called FLOW_C having four lists with the following flow order:

LIST_7 flows to LIST_8
LIST_8 flows to LIST_9
LIST_9 flows to LIST_10

FLOW_A, FLOW_B and FLOW_C may be joined, for example as: FLOW_A joins to FLOW_C
FLOW_B joins to FLOW_C In this instance, the dialer flow order is provided as:

| | |
|---|---|
| LIST_1 flows to LIST _2 | |
| LIST_2 flows to LIST_3 | |
| LIST_3 flows to LIST_7 | ←FLOW_A's link to FLOW_C |
| LIST_4 flows to LIST_5 | |
| LIST_5 flows to LIST_6 | |
| LIST_6 flows to LIST_7 | ← FLOW_B's link to FLOW_C |

Those of skill in the art will now recognize that a plurality of different list links and flow links are possible with the present invention.

The list controller 41 (FIG. 1) maintains an internal buffer. This buffer, generally referred to as a list table, includes a slot allocated for each potential list that may be established. The flow controller 40 also maintains a buffer, generally referred to as a flow table, which includes entries that correspond to the entries of the list table, for lists that have been specified to a flow.

Offsets into the list table may be calculated according to equation 1.

$$\text{LIST\_SLOT} = ((\text{LN} * \text{RL}) + \text{HL}) \qquad \text{Equation 1}$$

in which
- LIST_SLOT corresponds to the offset in the list table
- LN corresponds to a list number (0 indexed)
- RL corresponds to a row length in the list table
- HL corresponds to a length of a header segment of the buffer.

Established list information is sequentially stored in the list table. Thus, assuming the list number LN is zero indexed, the first list established may be allocated a zero offset in the list table (i.e LIST_SLOT=0), and the next list established is allocated slot 1, etc., based on the formula above.

Similarly, offsets into the flow table may be according to equation 2:

$$\text{FLOW\_SLOT} = (\text{LN} * \text{RL}) \qquad \text{Equation 2}$$

in which
- FLOW_SLOT corresponds to the offset in the flow table,
- LN corresponds to a list number (0 indexed),
- RL corresponds to a row length in the flow table.

The row length of the flow table may be 8 bytes for example, which is long enough to contain an ASCII list identifier. Other lengths, may of course, also be used.

Each slot in the flow table may have a corresponding slot in the list table. For example, slot 0 in the flow table may correspond to slot 0 in the list table, slot 1 in the flow table may correspond to slot 1 in the list table, and so forth.

When a slot in the flow table has stored therein a list identifier, this indicates that the corresponding list in the list table flows into the list whose identifier matches the entry in the flow table.

By way of example assume that a pair of lists are established with a first one of the lists having a list identification corresponding to LIST_0 and a second one of the lists having a list identification corresponding to LIST_1. Further assume the lists are stored in slots 0 and 1 respectively, of the list table. If the user specifies that LIST_0 flows into LIST_1, the ASCII list identifier LIST_1 is moved into LIST_0's slot in the flow table The list identifier entries in the flow table would thus appear as shown in Table 1 below.

TABLE I

| SLOT 00 | LIST_1 |
|---|---|
| SLOT 01 | 000000 |
| . | |
| . | |
| SLOT NN | 000000 |

When LIST_0 enters an ending state and operator resources begin to be logged off, the flow controller 40 (FIG. 1) checks the flow table entry corresponding to LIST_0 for a list identifier Thus in this case, the flow controller checks SLOT 00 and finds the identifier LIST_1 stored therein. The flow controller 40 performs a look-up in the list table to find LIST_1, and the operators are logged onto this list. It should be noted that the entries in slots SLOT 01 to SLOT NN indicate that no list identifiers are stored therein.

Further expanding this example to include two flows, each of the flows including two lists and with the flows being joined or linked in a circular fashion, FLOW_A thus includes LIST_0 and LIST_1 which occupy list table slots 0 and 1 respectively. Likewise, FLOW_B includes LIST_2 and LIST_3 which occupy list table slots 2 and 3 respectively. Thus, if FLOW_A and FLOW_B are joined in a circular fashion, the list identifier entries in the flow table would appear as shown in TABLE II below:

TABLE II

| SLOT 00 | LIST_1 |
|---|---|
| SLOT 01 | LIST_2 |
| SLOT 02 | LIST_3 |
| SLOT 03 | LIST_0 |
| SLOT 04 | 000000 |
| . | |
| . | |
| SLOT NN | 000000 |

Here SLOT 00 indicates that LIST_0 flows into LIST_1, SLOT 01 indicates that LIST_1 flows into LIST_2, SLOT 01 indicates that LIST_2 flows into LIST_3 and SLOT 03 indicates that LIST_3 flows into LIST_0. It should thus be noted that LIST_1 flowing to LIST_2 indicates a link between FLOW_A and FLOW_B and likewise LIST_3 flowing to LIST_0 indicates a link between FLOW_B and FLOW_A to thus provide a circular flow.

Having described preferred embodiments of the invention, it will now become apparent to one of skilled in the art that other embodiments incorporating its concept may be used. It is felt therefore, that this invention should not be restricted to the preferred embodiment and that other modifications and substitutions will be apparent to those skilled in the art and within the scope of the claims which follow.

What is claimed is:

1. A method for controlling the dialing order of a plurality of call record lists by a predictive dialing system, including a predictive dialer, said method comprising the steps of:

selecting at least a first call record list and a second call record list from said plurality of call record lists, each of said first and second call record lists including at least one call record;

providing at least a first link from one of said at least one call records selected from a first one of said at least first and second call record lists, to one of said at least one call records selected from a second one of said at least first and second call record lists, for linking said at least first call record list and said second call record list in a predetermined order providing at least first and second linked lists to form at least a first list flow campaign; and providing said at least a first list flow campaign to said predictive dialing system, to allow said predictive dialing system to dial telephone numbers included in each call record according to the predetermined order of said at least first and second linked lists in said first list flow campaign.

2. The method of claim 1 wherein each of said first and second call record lists include a plurality of call records; and wherein the step of providing at least a first link further includes providing at least a second link from a first call record in a first linked list selected from said first and second call record lists, to a second call record record in said first linked list, for linking said plurality of call records in said first linked list to form said first list flow campaign.

3. The method of claim 1 wherein each of said first and second call record lists include a plurality of call records; and
   wherein the step of providing at least a first link includes the step of providing a first link from a first call record in said first call record list, to a first call record in said second call record list, for linking and ordering said first call record list to said second call record list in a predetermined order to form said first list flow campaign.

4. The method of claim 1 wherein said plurality of call record lists are provided by a host system.

5. The method of claim 3 further comprising the step of changing the predetermined order of said linked first and second call record lists.

6. The method of claim 5 wherein the step of changing the predetermined order of said linked lists comprises the step of:
   breaking the at least first link from the first call record in the first call record list to the first call record in the second call record list; and
   providing said at least first link from a first call record in said second call record list to a first call record in said first call record list, for linking and ordering said second call record list to said first call record list to form said first list flow campaign with a changed predetermined order of linked lists.

7. The method of claim 5 wherein the step of changing the predetermined order of said linked lists includes the step of linking a third call record list between said first call record list and said second call record list, said step of linking said third call record list comprising the steps of:
   providing said at least first link from said first call record in said first call record list to a first call record in said third call record list; and
   providing a second link from a second record in said third call record list to said first record in said second call record list.

8. The method of claim 3 wherein said step of providing at least a first link further includes providing a second link between a second call record in said second list to a second call record in said first list.

9. The method of claim 1 further comprising the steps of:
   selecting third and fourth call record lists from said plurality of call record lists, each of said third and fourth call record lists including at least one call record;
   providing a second link from one of said at least one call records in said third call record list to one of said at least one call records in said fourth call record list, for linking and ordering said third call record list to said fourth call record list in a predetermined order to form a second list flow campaign; and
   providing a third link between said first list flow campaign and said second flow campaign.

10. The method of claim 1 further including the step of automatically transferring at least one operator logged onto said first linked list from servicing calls dialed from said first linked list to servicing calls dialed from said second linked list upon the detection of a predetermined condition existing in said first linked list.

11. The method of claim 10 wherein said predetermined condition includes an end condition, wherein all telephone numbers in each call record in said first linked list have been dialed.

12. The method of claim 10 wherein said predetermined condition includes an ending condition wherein said predictive dialer is running out of telephone numbers, included in each call record, to dial.

13. The method of claim 10 wherein said predetermined condition includes a suspended condition, wherein said predictive dialer has suspended dialing of telephone numbers included in each call record.

14. A predictive dialing system comprising:
   a call list controller, responsive to a source of call records, each call record including at least one telephone number to be called, for establishing a plurality of call lists, each of said call lists including at least one said call record;
   a flow controller, coupled to said call list controller and responsive to said plurality of established call lists, for linking a plurality of call lists in a predetermined order to form at least a first list flow campaign; and
   a predictive dialer, coupled to at least said flow controller, and responsive to said at least a first list flow campaign, for dialing at least one telephone number included in each call record of said plurality of linked call record lists forming said first list flow campaign according to said predetermined order of linked call record lists.

15. The predictive dialing system of claim 14 wherein said flow controller is responsive to at least first and second list flow campaigns and to at least one list flow controller list flow control command, for joining and re-ordering said at least first and second flow campaigns.

16. The predictive dialing system of claim 14 wherein said source of call records includes a host processor.

17. The predictive dialing system of claim 14 wherein said call list controller operates off-line from said predictive dialer.

18. The predictive dialing system of claim 14 wherein said flow controller operates on-line with said predictive dialer.

19. A predictive dialing system comprising:
   a call list controller, responsive to a source of call records, each call record including at least one telephone number to be called, for establishing a plurality of call record lists, each of said call record lists including at least one said call record;
   a flow controller, coupled to said call list controller and responsive to said established call record lists, for providing at least a first link from a first call record in a first call record list selected from said plurality of call record lists, to a first call record in a second call record list selected from said plurality of call record lists, for linking and ordering said first call record list to said second call record list in a first predetermined order to form at least a first list flow campaign, and for applying said at least first list flow campaign to a predictive dialer, and for providing at least a third link from a first call record in a third call record list selected from said plurality of call record lists, to a fourth call record in a fourth call record list selected from said plurality of call record lists, for linking and ordering said third call record list to said fourth call record list in a first predetermined order to form at least a second list flow campaign, and for applying said second list flow campaign to said predictive dialer;

said flow controller responsive to at least said first and second list flow campaigns and to at least one list flow controller list flow control command, for joining and re-ordering said at least first and second list flow campaigns in a second predetermined order once applied to said predictive dialer; and a predictive dialer, coupled to at least said flow controller, and responsive to said at least first and second list flow campaigns, for dialing at least one telephone number included in each call record of said plurality of linked call record lists forming said at least first and second list flow campaigns according to said predetermined order of linked call record lists and list flows.

* * * * *